E. M. QUELLENNEC.
ROTARY AUTOMOBILE PLOWING AND HARROWING MACHINE.
APPLICATION FILED JUNE 8, 1906.

988,030.

Patented Mar. 28, 1911.

2 SHEETS—SHEET 1.

WITNESSES

INVENTOR
Edouard Marie Quellennec
BY
Howson and Howson
ATTORNEYS

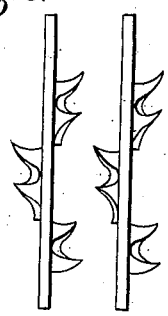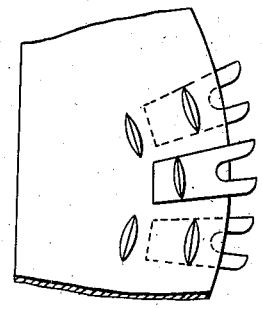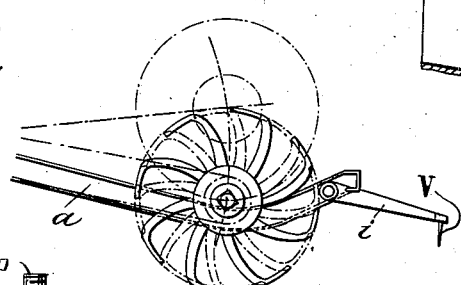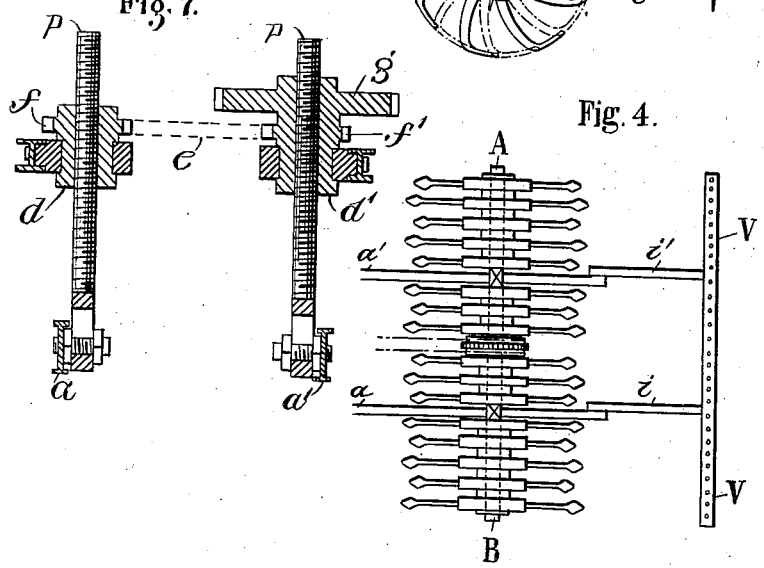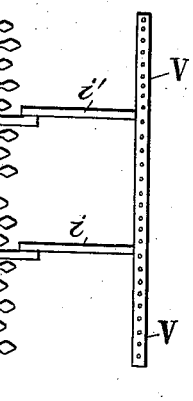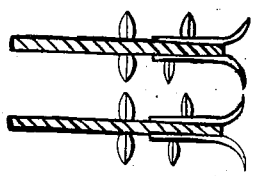

UNITED STATES PATENT OFFICE.

EDOUARD MARIE QUELLENNEC, OF PARIS, FRANCE, ASSIGNOR OF ONE-HALF TO EDMOND NICOLAS VERMOND, OF PARIS, FRANCE.

ROTARY AUTOMOBILE PLOWING AND HARROWING MACHINE.

988,030.

Specification of Letters Patent. Patented Mar. 28, 1911.

Application filed June 8, 1906. Serial No. 320,786.

*To all whom it may concern:*

Be it known that I, EDOUARD MARIE QUELLENNEC, a citizen of the Republic of France, and residing in Paris, France, engineer, have invented a Rotary Automobile Plowing and Harrowing Machine, of which the following is a specification.

The present invention relates to a rotary automobile plowing and harrowing machine, serving to break up the ground by digging, shoveling or cutting, and consequently to replace both the ordinary plow and harrow.

This machine is based upon the principle of the rotary digging, shoveling or cutting obtained by means of multiple picks, shovels or saws mounted upon one and the same shaft perpendicular to the axis of translation of the machine and to which a movement of rotation is imparted by means of a mechanical motor.

An example of this machine is represented in the accompanying drawings, in which:—

Figure 1:
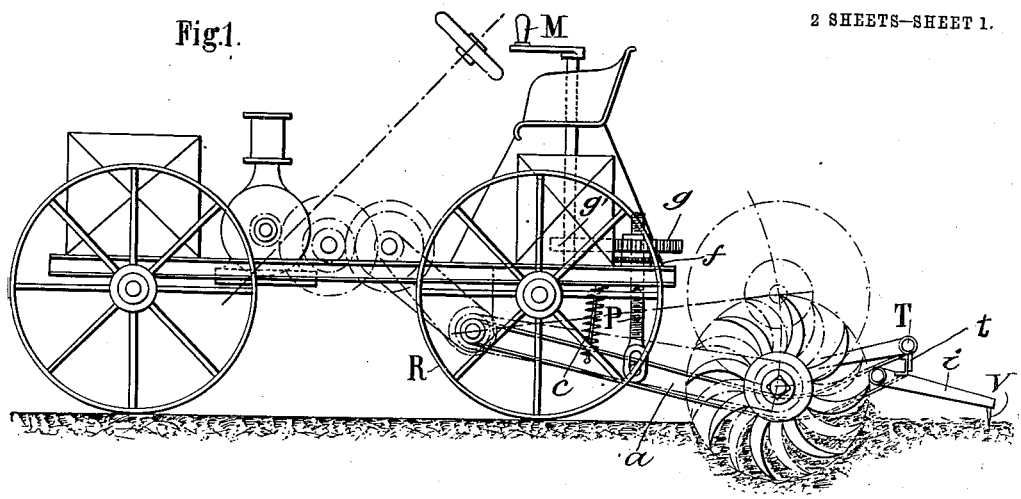
Figure 2:
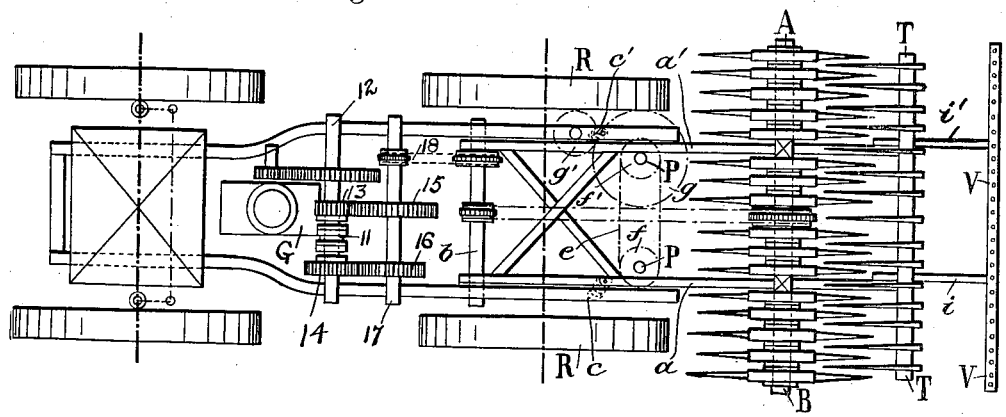
Figure 6:
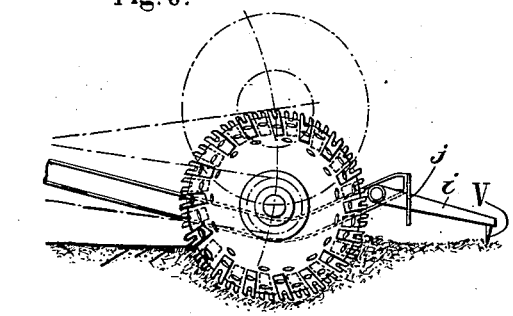
Figure 5:
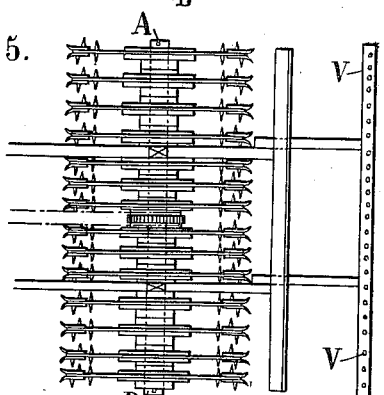

Figure 1 represents a longitudinal elevation of the machine provided with the digging tool. Fig. 2 is a corresponding plan view. Figs. 3 and 4 illustrate the arrangement of the shoveling tool in elevation and in plan respectively. Figs. 5 and 6 show the arrangement of the cutting tool in elevation and in plan respectively. Fig. 7 is a cross section of the lifting pin mechanism for the jib. Figs. 8, 9 and 10 are detail views of the cutting tool.

The machine is composed broadly (Figs. 1 and 2) of a frame on four wheels and of a rotary digging, shoveling or cutting tool arranged at the rear of the frame. The traveling movement of the machine, and the movement of rotation of the tool are produced by means of any appropriate motor, such as a gasolene, spirit, alcohol, steam, electric or other motor mounted upon the frame. The transmission of the movement to the driving wheels R R of the machine with change of speed for different conditions of work and of transportation has not been shown in order to simplify the drawing.

The method of transmitting movement to the tools shown in the drawing is only given by way of example; it is likewise by way of illustration that this drawing shows a two-speed gear because if the same apparatus is intended to work on land of different composition, the transmission gear should be adapted to produce as many different speeds as necessary. As shown in the drawing, the variable speed is obtained by means of the clutch 11 mounted on a feather on the shaft 12 driven by the motor G and adapted to be moved into engagement with either of the free pinions 13 or 14 which are of different size and mesh with corresponding pinions 15 and 16 on the spindle 17. The spindle $b$ is driven from the latter by means of the chain 18.

The tool, whether it be a pick, shovel or cutter, comprises a shaft A B upon which there are mounted side by side disks each of which carries a certain number of picks (Figs. 1 and 2) shovels (Figs. 3 and 4) or cutting elements (Figs. 5 and 6). The number, form and dimension of the picks, shovels or cutting elements, their projection from the shaft and the method of mounting them upon this shaft, may vary according to the nature and composition of the land, the depth to which it is to be tilled, and generally speaking in accordance with the local conditions to be complied with. The picks, shovels and the cutting elements are curved in such a manner as to penetrate the ground merely owing to the fact of the rotation of the shaft A B. During the operation, the picks, shovels or saw cutting elements owing to their curved form, and the manner in which they seize the ground, assist the forward movement of the machine. The manner in which the tool works also produces an intimate mixing of the manure with the ground.

The picking, shoveling or cutting tool may be connected to the frame in any appropriate manner, but so that it may be raised and lowered at will. In the drawing the connection is effected by means of a ladder frame or jib with two arms $a$, $a^1$ rotatably mounted upon a shaft $b$ fixed to the framework. If the weight of the jib and of the tool is not sufficient to keep the picks, shovels, or cutting elements well in engagement with the ground, springs $c$, $c^1$ bearing on the one hand upon the frame, and on the other hand upon the arms of the jib, will supply the necessary additional pressure.

The jib which is hinged on the shaft $b$, is raised or lowered by means of screw pins P to which its arms $a$ $a^1$ are connected by bolts working within terminal eyes in the pins. The pins pass through screw threaded bearings $d$ rotatably mounted in the frame. On one of these bearings is secured a gear wheel $g$ which meshes with the pinion $g^1$ on the spindle carrying the hand wheel M. Each of the bearings is provided also with a cogwheel $f$, $f^1$ over which the chain $e$ passes thus securing their synchronous rotation. It is thus apparent that by actuating the hand wheel M the jib carrying the tool may be raised or lowered to secure any desired depth of tillage or may be carried entirely above the ground during the transportation of the machine. There is an eye joint between the jib and the screw P which permits a certain play between the parts to accommodate obstacles opposing great resistance to the rotation and advance of the tool. Springs $c$, $c^1$, may be arranged if necessary to deaden the shocks produced by this rising of the tool.

For the purpose of detaching the earth if it remains adhering to the picks after they leave the ground, a cleaning device composed of a series of knives mounted upon one and the same bar T T is employed; these knives engage between the picks during their movement of rotation in such a manner as to loosen the earth automatically; these knives are able to rise partially in order to avoid the risk of breakage in case the effort to be overcome should be too great. For this purpose they may be pivotally mounted on the bar T as shown in Fig. 1, and provided with springs $t$ to return them to position after deflection.

In order that the soil may lie quite uniformly after the passage of the apparatus, a rake V V is loosely secured by means of arms $i$, $i^1$, to the ends of the jib arms $a$, $a^1$.

The cutting tool (Figs. 5 and 6) is composed of a shaft A B on which there are mounted side by side circular plates provided with two teeth upon their edge and upon their faces. The teeth both upon the edge and upon the faces of the plate are alternate external teeth and project sufficiently for producing the complete disaggregation of the ground between the two adjacent plates; they are curved in order to bite the ground and assist the forward movement. Further, the number, form and dimensions of the teeth, and also their projection may vary in accordance with the nature and the disposition of the ground, the depth to which it is to be worked and generally speaking in accordance with the local conditions.

This tool is specially adapted for treating the hardest and driest land. It roots up the stubble, roots and grass, and breaks up and pulverizes the ground.

The cutting tool is connected to the frame and driven by the motor in the same manner as the digging or shoveling tool. In the drawing, the chain for the transmission of movement to the tool is shown in the middle, but it might equally well be placed at the extremity.

In order to prevent the earth from being projected, there may be arranged at the rear extremity of the machine parallel with the shaft of the cutting tool a screen $j$ which serves to stop the earth projected by the teeth of the saw.

Although I have shown and described a gasolene or the like motor mounted upon the frame for the purpose of imparting a traveling movement to the machine, I do not desire to limit my invention to this motive means, and it should be understood that any appropriate means as for example, animal or mechanical traction may be employed in order to impart a traveling motion to the vehicle.

What I claim and desire to secure by Letters Patent of the United States is:—

1. In a machine of the character described, a rotary tilling tool comprising a plurality of suitably formed disks, a jib carrying the same, in combination with an upwardly angled extension of said jib beyond said tool and a screen arranged behind the tool and carried by said extension, substantially as described.

2. In a machine of the character described, a rotary tilling tool, a flexibly mounted jib carrying the same, said jib comprising a plurality of arms supporting the shaft of said tool, in combination with a plurality of threaded eye bars extending down to said arms of the jib, means in connection with the latter for engaging with lost motion the eyes of said eye bars and means for screwing said eye bars up and down whereby the position of said jib may be controlled.

In testimony whereof I have signed my name to this specification, in the presence of two subscribing witnesses.

EDOUARD MARIE QUELLENNEC.

Witnesses:
LEVI CRANE HURT,
HANSON C. COXE.